E. DUFFY.
Saw-Sharpening and Setting-Machines.
No. 139,304. Patented May 27, 1873.

Witnesses
John L. Boone
C. M. Richardson

Edward Duffy
per Dewey & Co
Attys

E. DUFFY.
Saw-Sharpening and Setting-Machines.
No. 139,304. Patented May 27, 1873.
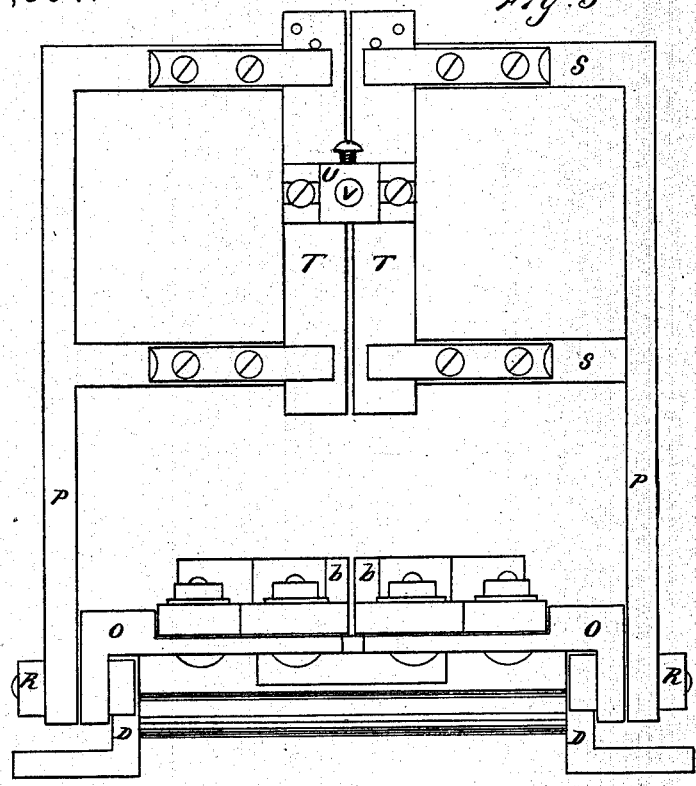
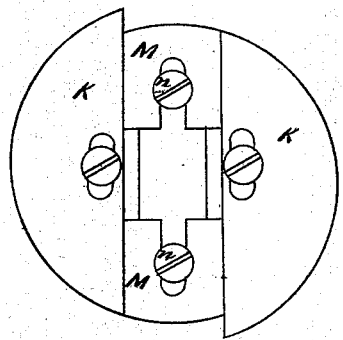
Witnesses.

UNITED STATES PATENT OFFICE.

EDWARD DUFFY, OF OAKLAND, CALIFORNIA.

IMPROVEMENT IN SAW SHARPENING AND SETTING MACHINES.

Specification forming part of Letters Patent No. 139,304, dated May 27, 1873; application filed March 12, 1873.

*To all whom it may concern:*

Be it known that I, EDWARD DUFFY, of Oakland, Alameda county, State of California, have invented a Saw Filing and Setting Machine; and I do hereby declare the following description and accompanying drawings are sufficient to enable any person skilled in the art or science to which it most nearly appertains to make and use my said invention without further invention or experiment.

The object of my invention is to provide an improved machine for filing and setting saws at one operation; and it is especially applicable to the filing and setting of endless or band saws without removing them from their working position. It consists, mainly, in a novel combination of mechanism for guiding and steadying the saw as it moves, with an adjustable rotary file and device for moving the saw along one tooth at each revolution, or partial revolution, so as to file the next tooth. It also consists in the employment of an adjustable setting device, which is operated by a cam or other movement, so as to set the teeth of the saw as it moves along, and before they reach the file.

Figure 1:
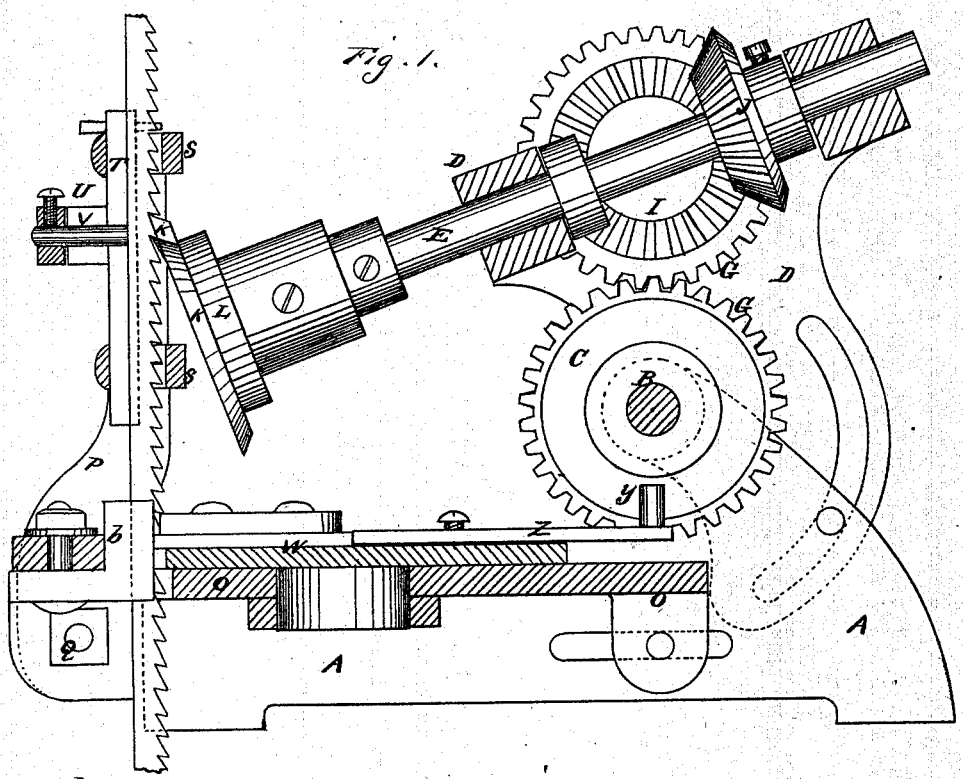
Figure 2:
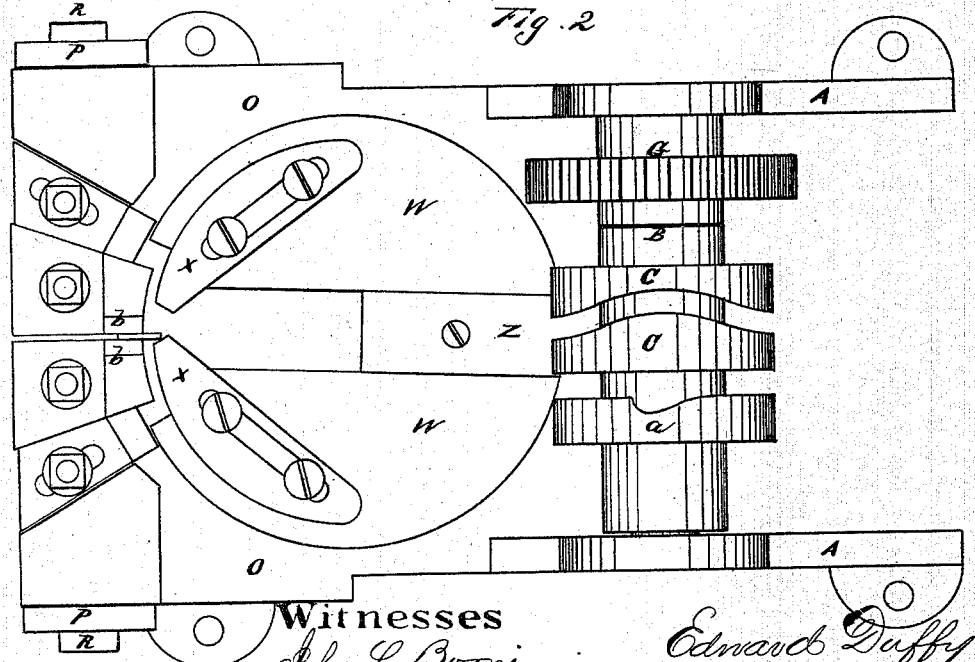

Referring to the accompanying drawings for a more complete explanation of my invention, Figure 1 is a side sectional elevation of my machine. Fig. 2 is a horizontal section. Fig. 3 is a front view. Fig. 4 is a front view of the adjustable file.

A is a bed, made strongly, and having arms extending upward at one end for the purpose of supporting the driving-shaft B. This shaft carries the cams C which actuate the setting apparatus, and also serves as an axis about which the frame D which carries the file turns, and is adjusted. The shaft E extends longitudinally across the frame D, as shown, and the rotary file is secured to its end. Motion is given to this file-shaft by spur-gears G on the driving-shaft H, and upon a short shaft at the top of the frame D. The bevel-gears I and J transmit the motion to the shaft E, and thus the file is driven.

The file consists of two segments, K, which have their edges beveled and cut properly so as to serve as files. These segments are screwed to a face-plate, L, at a little distance apart, and different sizes and bevels can be used for different-sized saws. Between the segments K the face-plate has a dovetailed groove extending across it, and the adjusting-slides M are fitted into this groove and secured at any point by set-screws N. These slides serve, with the segments, to gage the feed, so that the saw will be moved upward just one tooth at each semi-revolution of the file. This is done by setting the segmental files upon the face-plate, as shown, one being set eccentrically to one side of a central line, while the other is set to the other side. Any slight difference may be regulated by the slides M. The projecting ends of each of the segments K are cut back a little from the general plane, so that as these ends leave the tooth the adjacent edge of the slide M will catch the next tooth of the saw from below as the file rotates. An adjustable table, O, is placed upon the bed A, and this table moves forward or back independently of the frame D, which carries the file, so that wide or narrow saws can be held with their teeth in the proper relative position to the file, and also to vary the angle at which the teeth are filed. At the front end of the table O are two standards, P, which are adjustable about an axis, Q, at the bottom, and nuts R serve to bind the standards so that they will be firm at any angle at which they are set. Cross-bars S S connect the standard P, and support the guide-plates T vertically between them. These plates can be separated sufficiently to admit a saw to pass between them when the machine is set up to the saw for use. A plate, U, is screwed to the back of these guides after the saw is introduced, and a steadying-pin, V, passes through this plate, and is secured by a set-screw, so as to just rest against the back of the saw opposite to the point where the file is working, the guide T being raised or lowered to suit the position of the file. Upon the table O is a disk, W, which turns upon a central pin passing into the table below. Two angularly-placed plates or arms, X, are secured to the disk W with their ends made to stand upon each side of the saw-teeth, and they are so formed that when they are made to press alternately against the teeth they will set them as much as desired. To do this, the disk W must be oscillated slightly from one side to the other, and this is done by means of the cams C upon the driving-shaft B. These cams stand at each side of an upwardly-projecting pin, Y, which stands upon the disk W, or upon an adjustable slide, Z, which may be set at any point to suit the relative positions of the movable table O and the cams.

If it be desired to give the setting device a sudden motion or blow, this can be done by means of the cam a, which is so shaped as to act upon the pin Y with a sudden motion.

The operation of my machine will be as follows: If it is desired to set and file a band-saw, the machine is placed upon the table and moved up to the saw, which will enter between the guides b which are secured to the table O opposite the setting device. The plate U and steadying-pin V are thus adjusted, and the frame D is turned forward until the rotary file stands at the proper angle, resting its edge beneath a tooth of the saw. The standards P and the frame D are clamped in place, and the shaft B is set in motion by means of a crank. The disk W, with its setting-arms X, is turned from side to side by the action of the cams C, and the teeth of the saw, which just project from between the guides b, are alternately set to one side and the other as much as desired. The file rotates, as before described, and sharpens each tooth as it is reached, and, by its peculiar construction, feeds the saw forward one tooth at each half revolution, the filing and setting acting in conjunction. By this means the labor is much lessened, the work rapidly and accurately done, and with very little delay.

If it be necessary to only file the saw, the standard P can be inclined a little more backward, which will carry the saw far enough back in the guide b to escape the action of the setting-arms.

Having thus described my invention, what I claim, and desire to secure by Letters Patent, is—

1. The file, consisting of the adjustable segments K K secured to the face-plate, and operating substantially as and for the purpose herein described.

2. In combination with the segments K K, the sliding plates M for minute adjustment, substantially as herein described.

3. The movable standards P with their guides T T, and the steadying-pin V for holding and guiding the saw, when made adjustable, substantially as and for the purpose above described.

4. The bed O with its standards P, and the guides T, when made adjustable to or from the file, for the purpose of accommodating the different-sized saws, and for changing the angle at which the file cuts the teeth, substantially as herein described.

5. The oscillating disk W with its adjustable setting-arms X, together with the cams a and C, for the purpose of setting the teeth, substantially as herein described.

In witness whereof I hereunto set my hand and seal.

EDWARD DUFFY. [L. S.]

Witnesses:
JOHN L. BOONE,
C. M. RICHARDSON.